US010117186B2

(12) United States Patent
Denzel et al.

(10) Patent No.: US 10,117,186 B2
(45) Date of Patent: Oct. 30, 2018

(54) APPARATUSES AND METHODS FOR CONTROLLING ALWAYS-ON DISPLAYS FOR MOBILE DEVICES

(71) Applicant: Motorola Mobility LLC, Chicago, IL (US)

(72) Inventors: Mark D Denzel, McHenry, IL (US); Parikshit Dharawat, Sunnyvale, CA (US); Christian L Flowers, Chicago, IL (US); Yun-Ling Lee, San Jose, CA (US); Anita P Mhaskar, San Jose, CA (US)

(73) Assignee: Motorola Mobility LLC, Chicago, IL (US)

( * ) Notice: Subject to any disclaimer, the term of this patent is extended or adjusted under 35 U.S.C. 154(b) by 124 days.

(21) Appl. No.: 15/079,706

(22) Filed: Mar. 24, 2016

(65) Prior Publication Data

US 2017/0280384 A1    Sep. 28, 2017

(51) Int. Cl.
*H04W 52/02* (2009.01)

(52) U.S. Cl.
CPC ..... *H04W 52/027* (2013.01); *H04W 52/0254* (2013.01)

(58) Field of Classification Search
CPC . H04W 52/02; H04W 52/0216; H04W 84/12; H04W 52/0229; H04W 84/18
See application file for complete search history.

(56) References Cited

U.S. PATENT DOCUMENTS

| 6,055,413 | A * | 4/2000 | Morse | H04L 12/1895 |
| | | | | 340/7.43 |
| 2007/0132663 | A1* | 6/2007 | Iba | G06F 3/013 |
| | | | | 345/8 |
| 2014/0266702 | A1* | 9/2014 | Forster-Knight | H04W 4/12 |
| | | | | 340/539.13 |
| 2014/0344834 | A1* | 11/2014 | Szabo | G06Q 10/107 |
| | | | | 719/318 |
| 2015/0227213 | A1* | 8/2015 | Cho | G06F 3/0219 |
| | | | | 345/157 |
| 2016/0137194 | A1* | 5/2016 | Kajiwara | B60W 20/50 |
| | | | | 701/22 |
| 2016/0248964 | A1* | 8/2016 | Okamoto | G03B 17/561 |

OTHER PUBLICATIONS

Apple, "Notifications", https://developer.apple.com/library/ios/documentation/UserExperience/Conceptual/MobileHIG/NotificationCenter.html, Jan. 4, 2016, 4 pages.
Motorola, "Motorola Keylink", http://www.motorola.com/us/consumers/headeraccessoriesmore/MotorolaKeylink/keylink.html, Jan. 4, 2016, 4 pages.
Android, "Notification", http://developer.android.com/guide/topics/ui/notifiers/notifications.html, Jan. 4, 2016, 3 pages.

* cited by examiner

*Primary Examiner* — Charles C Jiang
*Assistant Examiner* — Thad N Defauw
(74) *Attorney, Agent, or Firm* — Yudell Isidore PLLC

(57) ABSTRACT

Receiving a first notification at a mobile device, displaying a first set of information related to the first notification for a first time period commencing when the first notification is received, analyzing data from a sensor of the mobile device to detect a presence of a user, in response to detecting the presence of the user, and also in response to receiving a subsequent notification, displaying an updated set of information related to the subsequent notification during a second time period that commences upon receipt of the subsequent notification.

20 Claims, 6 Drawing Sheets

APPARATUSES AND METHODS FOR CONTROLLING ALWAYS-ON DISPLAYS FOR MOBILE DEVICES

FIELD OF THE DISCLOSURE

The present disclosure relates generally to displays for mobile devices and, more particularly, to methods and apparatuses for selecting notification information for display on the mobile device based upon whether or not a presence of a user is detected.

BACKGROUND OF THE DISCLOSURE

Mobile devices may provide a display that appears to be in an always-on state. One concern with an always-on display relates to power consumption and battery drain. A display that is continuously on or easily activated may drain a significant amount of power from the battery. In addition, the mobile device includes a central processing unit (CPU) or an auxiliary graphics processor that processes graphics and display elements for the display. Having an always-on display will consume finite processor resources. The foregoing factors may result in a slower mobile device with an undesirably short battery life. In view of these considerations, it would be advantageous if an improved always-on state feature could be implemented that provided enhanced functionality with regard to one or more of the foregoing concerns or other concerns.

SUMMARY

In at least some embodiments, the present disclosure relates to a method that includes receiving a first notification at a mobile device, displaying a first set of information related to the first notification at a first frequency for a first time period, wherein the first time period commences when the first notification is received, analyzing data from one or more sensors of the mobile device to detect a presence of a mobile device user, in response to detecting the presence of the user during the first time period, and also in response to receiving a subsequent notification after the first notification, displaying an updated set of information related to the subsequent notification at a second frequency during a second time period that commences upon receipt of the subsequent notification, such that the detecting of the presence of the user during the first time period may occur before, or after, or concurrently with the receiving of the subsequent notification. Illustratively, the first time period is substantially equal to the second time period, and the first frequency is substantially equal to the second frequency.

Pursuant to at least some such embodiments, the method further includes displaying the updated set of information during any time remaining in the first time period at the first frequency, in response to the mobile device receiving the subsequent notification and not detecting the presence of the user prior to receiving the subsequent notification. According to a set of alternate embodiments, in response to not detecting the presence of the user throughout the first time period, the updated set of information for the subsequent notification is displayed only once.

Additionally, in at least some embodiments, the present disclosure relates to a mobile device that includes one or more sensors for detecting a presence of a mobile device user; a communications mechanism for receiving at least a first notification and a subsequent notification after the first notification; a display mechanism configured for displaying the first notification and the subsequent notification; and a processing mechanism, operatively coupled to the communications mechanism, the one or more sensors, and the display mechanism, for controlling a display of the first notification and the subsequent notification. The communications mechanism receives a first notification, and the display mechanism displays a first set of information related to the first notification at a first frequency for a first time period, wherein the first time period commences when the first notification is received. The processing mechanism analyzes data from the one or more sensors to detect the presence of the user. In response to detecting the presence of the user during the first time period, and also in response to the communications mechanism receiving the subsequent notification, an updated set of information related to the subsequent notification is displayed on the display device at a second frequency during a second time period that commences upon receipt of the subsequent notification, such that the detecting of the presence of the user during the first time period may occur before, or after, or concurrently with the receiving of the subsequent notification. Illustratively, the first time period is substantially equal to the second time period, and the first frequency is substantially equal to the second frequency.

In response to the communications mechanism receiving the subsequent notification and the processing mechanism not detecting the presence of the user prior to receiving the subsequent notification, the display mechanism displays the updated set of information during any time remaining in the first time period at the first frequency. According to a set of alternate embodiments, in response to not detecting the presence of the user throughout the first time period, the updated set of information for the subsequent notification is displayed only once.

DETAILED DESCRIPTION

Figure 1:
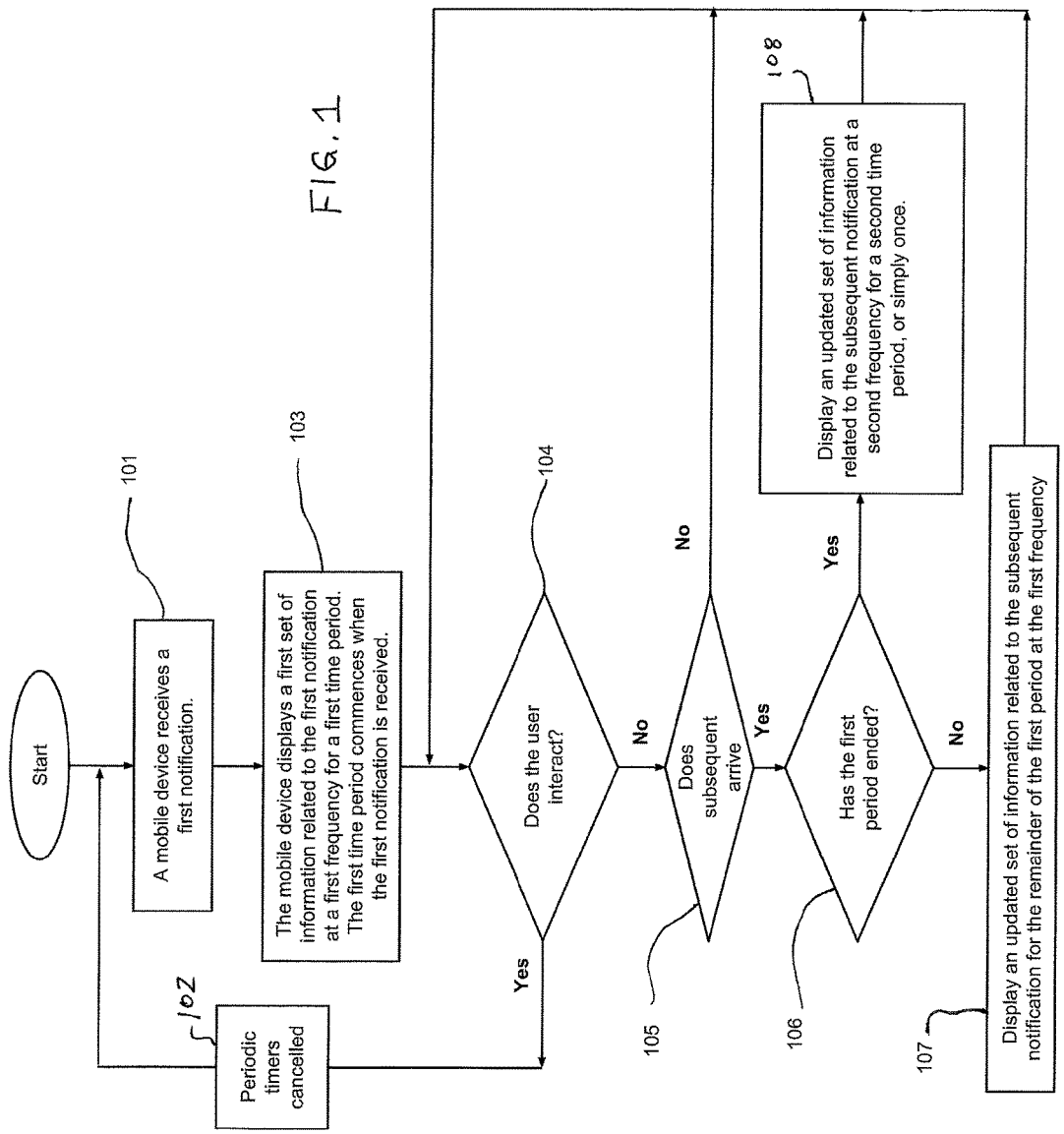
FIG. 1 is a flowchart setting forth an illustrative operational sequence for selecting notification information for display on the mobile device, based upon whether or not a presence of a user is detected, in accordance with a set of exemplary embodiments.

FIG. 1 is a flowchart setting forth an illustrative operational sequence for selecting notification information for display on a mobile device, based upon whether or not a presence of a user is detected, in accordance with a set of exemplary embodiments.

Upon starting, the operational sequence commences at block 101 where a mobile device receives a first notification. A notification is an indication to a user of an event. Some illustrative examples of events include new incoming messages, changes in device status, and changes in ongoing application events. New incoming messages may comprise incoming email messages, short message service (SMS) messages (often referred to as text messages), or instant messages. Device status changes may relate to low battery power or loss of a communications link such as a Wi-Fi or cellular connection. Ongoing application events may comprise events related to music or video playback.

The notification may be provided in the form of one or more sounds, one or more vibrations, or one or more displayed items. For example, a notification may be displayed by blinking a light-emitting diode (LED) lamp, updating a status bar on a display screen, displaying a lock screen on the display screen, displaying a transient or pop-up message, providing a dialog box, providing a full-screen pop-up, displaying a message comprising text, displaying an image, or displaying an icon.

Next, at block 103, the mobile device displays a first set of information related to the first notification at a first frequency for a first time period. The first time period commences when the first notification is received. For example, the displayed first set of information may be pulsed on for 2 to 30 seconds, then pulsed off for 2 to 30 seconds, and pulsed back on for 2 to 30 seconds, and so on, until expiration of the first time period. Optionally, a brightness level of the display may be controlled such that the display turns on gradually when pulsed on, and turns off gradually when pulsed off.

The operational sequence advances to block 104 where data from one or more sensors of the mobile device is analyzed to determine whether or not a user interaction has occurred (or is occurring) during the first time period, which can serve as an indication of a presence of a mobile device user during the first time period. The presence of the mobile device user may be detected by detecting any of a variety of user interactions with the mobile device. Some illustrative examples of user interactions include pressing a power-on key, nudging the mobile device, entering an input into a keypad or a display of the mobile device, stowing the mobile device in a pocket or purse, removing the mobile device from a pocket or purse, reorienting the mobile device from facing upwards to facing downwards, reorienting the mobile device from facing downwards to facing upwards, rotating the mobile device, detecting a user motion using an infrared sensor, detecting pressure applied by the user to a touch-sensitive display screen, sensing a change in room temperature or barometric pressure, detecting a source of acoustic energy, detecting a voice command, detecting a change in ambient noise, or detecting a presence of another device such as a Bluetooth headset. In the present embodiment and at least some other embodiments, the data that is analyzed in order to determine if a user interaction has (or is) occurring or if a user is present (which can particularly be obtained for example from certain sensors integrated in the mobile device, such as infrared (IR) sensors, accelerometers, etc.) is particularly obtained and analyzed while the mobile device is operating in a low power mode or state. Such a low power mode or state can be considered a reduced power-usage state during which a lesser amount of power is used by the mobile device, and/or one or more subcomponents of the mobile device are shut off or using less power, relative to operation in a normal power mode or high power mode.

If at the block 104 it is determined that a user interaction has occurred (or is occurring), the operational sequence proceeds along the affirmative branch from block 104 leading back to the block 101. That is, in this circumstance, the process is reset to start over again due to the detected user interaction. Any periodic display, whether from first or subsequent notifications, is ceased. Alternatively, if at the block 104 it is determined that a user interaction has not occurred (or is not occurring), or that no user interaction has been detected or is being detected, then the operational sequence instead proceeds along the negative branch from the block 104 leading to block 105. At the block 105, a test is performed to ascertain whether or not the mobile device receives a subsequent notification. If no subsequent notification has been received, then the process proceeds along a negative branch from the block 105 leading back to the block 104. Thus, the process of FIG. 1 involves repeatedly or continuously determining whether the user interaction has occurred at the block 104 and whether the subsequent notification has occurred at the block 105 so long as no user interaction has been detected and so long as a subsequent notification has not yet arrived.

Alternatively, if it is determined at the block 105 that a subsequent notification has been received (or is being received), then the operational sequence advances to block 106, at which the status of the first time period (the first time period established at the block 103) is checked—that is, it is determined whether the first time period has expired yet.

If at the block 106 it is determined that the first time period has not yet ended, the operational sequence advances to block 107 where, in response to receiving the subsequent notification, an updated set of information related to the subsequent notification is displayed at the first frequency for the remaining time in the first period. Alternatively, if the first time period has ended as determined at the block 106, then the process advances according to a positive branch leading from the block 106 to a block 108. At the block 108, in response to the mobile device receiving the subsequent notification at the block 105 and not detecting a user interaction (indicating the presence of the user) at the block 104 prior to receiving the subsequent notification, the updated set of information is displayed for a second time period at a second frequency, or the updated set of information is displayed only once (that is, one time rather than being repeatedly display multiple times). In this regard, it should be appreciated that, depending upon the embodiment or implementation or operational circumstance, either the updated set of information can be displayed at the second frequency or only one time. In some embodiments, for example, upon receipt of a first subsequent notification, an updated set of information related to that first subsequent notification can be displayed at the second frequency, and upon receipt of a second subsequent notification, a second updated set of information related to that second subsequent notification can be displayaed only one time.

It should be understood that the detecting of the presence of the user during the first time period at block 104 may occur before, or after, or concurrently with the receiving of the subsequent notification at block 105. Also, although illustratively in the present embodiment the first time period is substantially equal to the second time period and the first frequency is substantially equal to the second frequency, in other cases, the two time periods need not be the same, and/or the two frequencies need not be the same. Moreover, the second time period may, but need not, commence before the end of the first time period. Further, although the updated set of information displayed at the step 108 can be the same as the updated set of information displayed at the step 107 in some embodiments, in other embodiments the updated sets of information need not be identical.

The aforementioned operational sequence of FIG. 1 merely provides a set of illustrative examples that are intended to be encompassed by the present disclosure. The present disclosure is intended to encompass numerous other manners of operation in addition to those specifically described previously. Numerous other examples of operation in accordance with the processes of FIG. 1, or variations of these processes, can be envisioned and are encompassed herein.

In at least some embodiments, the present disclosure relates to a mobile device that includes one or more sensors for detecting a presence of a mobile device user; a communications mechanism for receiving at least a first notification and a subsequent notification; a display mechanism configured for displaying the first notification and the subsequent notification; and a processing mechanism, operatively coupled to the communications mechanism, the one or more sensors, and the display mechanism, for controlling a display of the first notification and the subsequent notification.

In at least some such embodiments, the communications mechanism receives a first notification, and the display mechanism displays a first set of information related to the first notification at a first frequency for a first time period, wherein the first time period commences when the first notification is received. The processing mechanism analyzes data from the one or more sensors to detect the presence of the user. In response to detecting the presence of the user during the first time period, and also in response to the communications mechanism receiving the subsequent notification, an updated set of information related to the subsequent notification is displayed on the display device at a second frequency during a second time period that commences upon receipt of the subsequent notification. Illustratively, the first time period is substantially equal to the second time period, and the first frequency is substantially equal to the second frequency.

Also, in at least some such embodiments, in response to the communications mechanism receiving the subsequent notification and the processing mechanism not detecting the presence of the user prior to receiving the subsequent notification, the display mechanism displays the updated set of information during any time remaining in the first time period at the first frequency.

Figure 2:
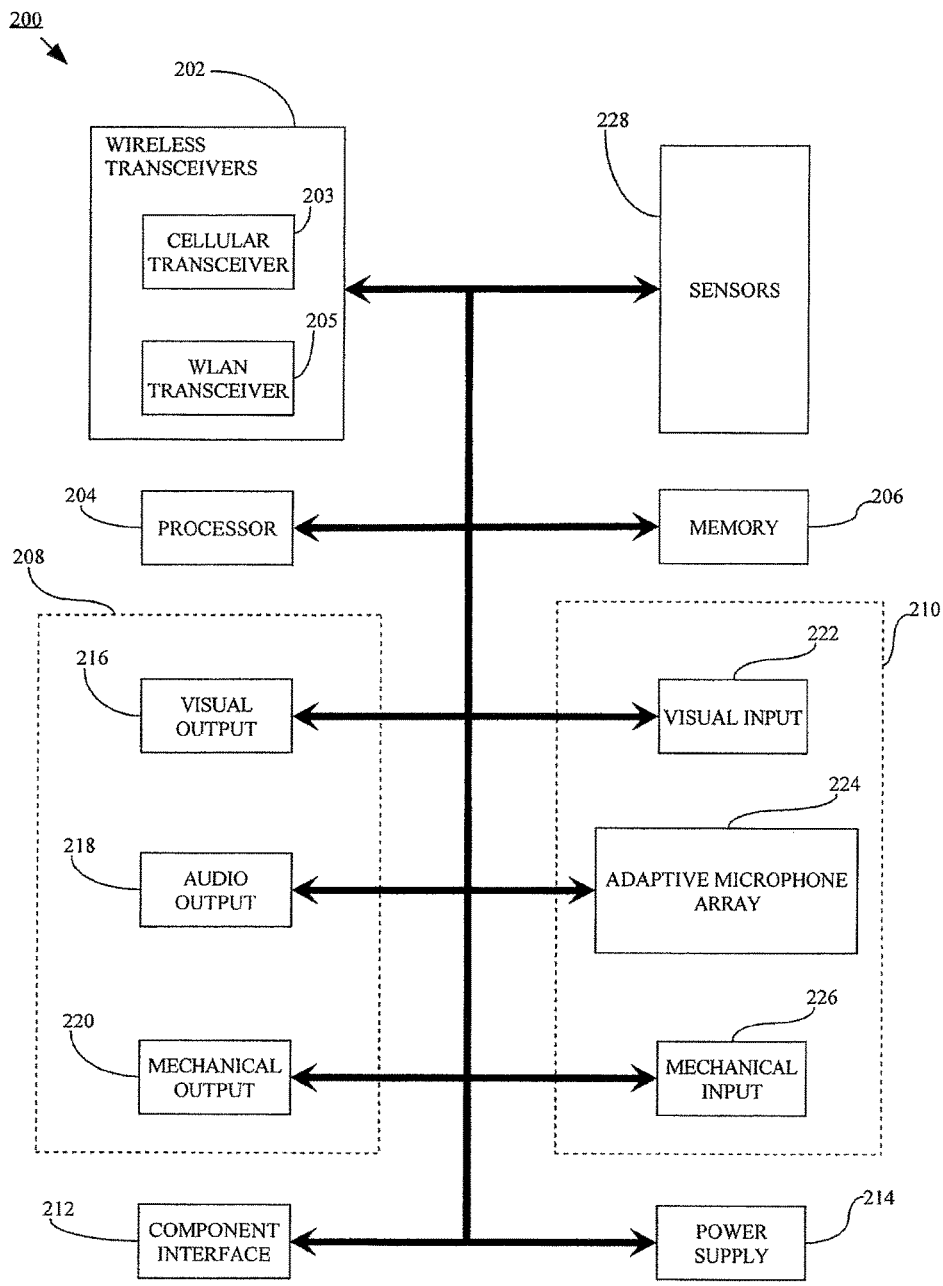
FIG. 2 is a hardware block diagram showing an illustrative mobile device that is configured for selecting notification information for display, based upon whether or not a presence of a user is detected, in accordance with a set of exemplary embodiments.

FIG. 2 is a hardware block diagram showing an illustrative mobile device that is configured for selecting notification information for display, based upon whether or not a presence of a user is detected, in accordance with a set of exemplary embodiments. The mobile device 200 is representative of any communication device that is operated by persons (or users) or possibly by other entities (e.g., other computers) desiring or requiring communication capabilities. In some embodiments, for example, the mobile device 200 may be any of a smartphone, a cellular telephone, a personal digital assistants (PDA), another type of handheld or portable electronic device, a headset, an MP3 player, a battery-powered device, a wearable device, a wristwatch, a radio, a navigation device, a laptop or notebook computer, a netbook, a pager, a PMP (personal media player), a DVR (digital video recorder), a gaming device, a game interface, a camera, an e-reader, an e-book, a tablet device, a navigation device with a video-capable screen, a multimedia docking stations, or another type of electronic mobile device.

As shown in FIG. 2, the illustrative mobile device 200 includes one or more wireless transceivers 202, a processor 204 (e.g., a microprocessor, microcomputer, application-specific integrated circuit, etc.), a memory 206, one or more output devices 208, and one or more input devices 210. In at least some embodiments, a user interface is present that comprises one or more output devices 208, such as a display, and one or more input devices 210, such as a keypad or touch sensor. The mobile device 200 can further include a component interface 212 to provide a direct connection to auxiliary components or accessories for additional or enhanced functionality. The mobile device 200 preferably also includes a power supply 214, such as a battery, for providing power to the other internal components while enabling the mobile device to be portable. Some or all of the components of the mobile device 200 can be coupled to one another, and in communication with one another, by way of one or more internal communication links 232 (e.g., an internal bus).

In the present embodiment of FIG. 2, the wireless transceivers 202 particularly include a cellular transceiver 203 and a wireless local area network (WLAN) transceiver 205. More particularly, the cellular transceiver 203 is configured to conduct cellular communications, such as 3G, 4G, 4G-LTE, etc., vis-à-vis cell towers (not shown), albeit in other embodiments, the cellular transceiver 203 can be configured instead or additionally to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

The WLAN transceiver 205 may, but need not, be configured to conduct Wi-Fi communications in accordance with the IEEE 802.11 (a, b, g, or n) standard with access points. In other embodiments, the WLAN transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the WLAN transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology. Thus, although in the present embodiment the mobile device 200 has two of the wireless transceivers 203 and 205, the present disclosure is intended to encompass numerous embodiments in which any arbitrary number of (e.g., more than two) wireless transceivers employing any arbitrary number of (e.g., two or more) communication technologies are present.

Exemplary operation of the wireless transceivers 202 in conjunction with others of the internal components of the mobile device 200 can take a variety of forms and can include, for example, operation in which, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceiver(s) 202 convey the modulated signals by way of wireless and (possibly wired as well) communication links to other devices such as a server and one or more content provider websites (as well as possibly to other devices such as a cell tower, access point, or another server or any of a variety of remote devices).

Depending upon the embodiment, the mobile device 200 may be equipped with one or more input devices 210, or one or more output devices 208, or any of various combinations of input devices 210 and output devices 208. The input and output devices 208, 210 can include a variety of visual, audio and/or mechanical outputs. For example, the output device(s) 208 can include one or more visual output devices 216 such as a liquid crystal display and light emitting diode indicator, one or more audio output devices 218 such as a speaker, alarm and/or buzzer, and/or one or more mechanical output devices 220 such as a vibrating mechanism. The visual output devices 216 can include, among other things, a video screen or a display mechanism.

In addition, by example, the input devices 210 (FIG. 11) may, but need not, include one or more sensors 228, or one or more audio input devices 224 such as a microphone, or more mechanical input devices 226 such as a flip sensor, keyboard, keypad, selection button, navigation cluster, touch pad, touchscreen, capacitive sensor, motion sensor, and switch. Actions that can actuate one or more of the input devices 210 can include not only the physical pressing/actuation of buttons or other actuators, but can also include, for example, opening the mobile device 200 (if the device can take on open or closed positions), unlocking the device, moving the device to actuate a motion, moving the device to actuate a location positioning system, and operating the device.

The mobile device 200 may also include one or more of various types of sensors 228. The sensors 228 can include, for example, proximity sensors (a light detecting sensor, an ultrasound transceiver or an infrared transceiver), touch sensors, altitude sensors, a location circuit that can include, for example, a Global Positioning System (GPS) receiver, a triangulation receiver, an accelerometer, a tilt sensor, a gyroscope, one or more sensors for detecting a presence of a user of the mobile device 200, or any other information collecting device that can identify a current location or user-device interface (carry mode) of the mobile device 200. Although the sensors 228 are for the purposes of FIG. 2 considered to be distinct from the input devices 210, in other embodiments it is possible that one or more of the input devices can also be considered to constitute one or more of the sensors (and vice-versa). Additionally, even though in the present embodiment the input devices 210 are shown to be distinct from the output devices 208, it should be recognized that in some embodiments one or more devices serve both as input device(s) and output device(s). For example, in embodiments where a touchscreen is employed, the touchscreen can be considered to constitute both a visual output device and a mechanical input device.

The memory 206 of the mobile device 200 can encompass one or more memory devices of any of a variety of forms (e.g., read-only memory, random access memory, static random access memory, dynamic random access memory, etc.), and can be used by the processor 204 to store and retrieve data. In some embodiments, the memory 206 can be integrated with the processor 204 in a single device (e.g., a processing device including memory or processor-in-memory (PIM)), albeit such a single device will still typically have distinct portions/sections that perform the different processing and memory functions and that can be considered separate devices.

The data that is stored by the memory 206 can include, but need not be limited to, operating systems, applications, and informational data, such as a database. Each operating system includes executable code that controls basic functions of the communication device, such as interaction among the various components included among the mobile device 200, communication with external devices via the wireless transceivers 202 and/or the component interface 212, and storage and retrieval of applications and data, to and from the memory 206.

In addition, the memory 206 can include one or more applications for execution by the processor 204. Each application can include executable code that utilizes an operating system to provide more specific functionality for the communication devices, such as file system service and the handling of protected and unprotected data stored in the memory 206. Informational data is non-executable code or information that can be referenced and/or manipulated by an operating system or application for performing functions of the communication device. One such application is a client application which is stored in the memory 206 and configured for performing the methods described herein.

The client application is intended to be representative of any of a variety of client applications that can perform the same or similar functions on any of various types of mobile devices, such as mobile phones, tablets, laptops, etc. The client application is a software-based application that operates on the processor 204 and is configured to provide an interface between one or more input devices 210, or one or more output devices 208, or any of various combinations thereof. The client application may be configured to perform the steps (as represented by the blocks) of FIG. 1. In addition, the client application governs operation of one or more of the input and output devices 210, 208. Further, the client application may be configured to work in conjunction with a visual interface, such as a display screen, that allows a user of the mobile device 200 to initiate various actions. The client application can take any of numerous forms and, depending on the embodiment, be configured to operate on, and communicate with, various operating systems and devices. It is to be understood that various processes described herein as performed by the mobile device 200 can be performed in accordance with operation of the client application in particular, and/or other application(s), depending on the embodiment.

Figure 3:
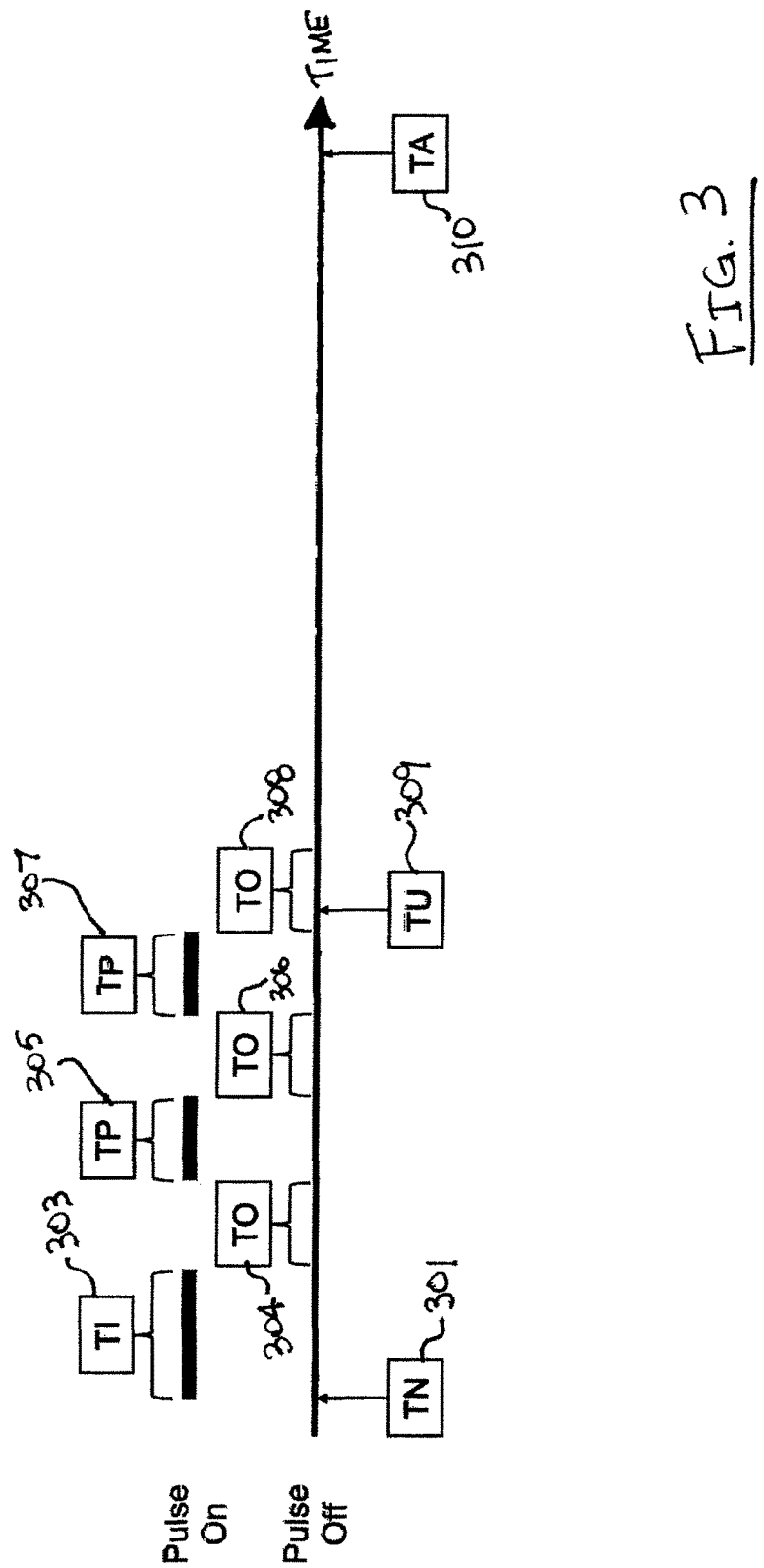
FIG. 3 is a first timing diagram illustrating a procedure for displaying a first notification in the presence of a user interaction, in accordance with a set of exemplary embodiments.

FIG. 3 is a first timing diagram illustrating a procedure for displaying a first notification in the presence of a user interaction in accordance with a set of exemplary embodiments. At step 301, a first notification arrives at a time TN. Next, at step 303, the first notification is displayed for a first time duration T1. Illustratively, T1 is selected to be within the range of approximately 2 to 60 seconds. For example, a value of 10 seconds may be selected for T1. At step 304, the display of the first notification is turned off for a second time duration of T0. Illustratively, T0 is selected to be within the range of approximately 2 to 60 seconds. For example, a value of 5 seconds may be selected for T0. T0 may, but need not, be equal to T1.

At step 305, the first notification is displayed for a third time duration TP and, at step 306, the display of the first notification is turned off for the second time duration T0. At step 307, the first notification is displayed a second time for the third time duration TP and, at step 308, the display of the first notification is turned off a third time for the second time duration T0. Illustratively, TP is selected to be within the range of approximately 2 to 60 seconds. For example, a value of 4 seconds may be selected for TP. During the second time duration T0 at step 308, a user interaction with the mobile device 200 (FIG. 2) is detected at a time TU 309. At step 310, a pulsing duration TA for displaying the first notification expires. For illustrative purposes, the pulsing duration TA may be set to 3 minutes from the time TN of the first notification arrival at step 301.

The display of the first notification may be conceptualized as being pulsed on and off in steps 303-308. In the example of FIG. 3, the user interaction may be detected prior to TA (step 310) and during either the second time duration T0 or the third time duration TP at any of steps 304-308, at which point the display of the first notification is no longer pulsed on and off. It should be appreciated that the step 301 can be considered to correspond to the block 101 of FIG. 1, that the steps 304 through 308 can be considered to correspond to the block 103 of FIG. 1, and that the step 309 can be considered to correspond to the occurrence of a user interaction as is represented by the affirmative branch leading back from the block 104 to the block 101 of FIG. 1. Notwithstanding these similarities, however, it should be appreciated that the manner of operation illustrated by FIG. 3 differs from that of FIG. 1 in several manners including, for example, FIG. 3 does not illustrate operation in which there is displayed any updated set of information based upon receipt of a subsequent notification.

Figure 4:
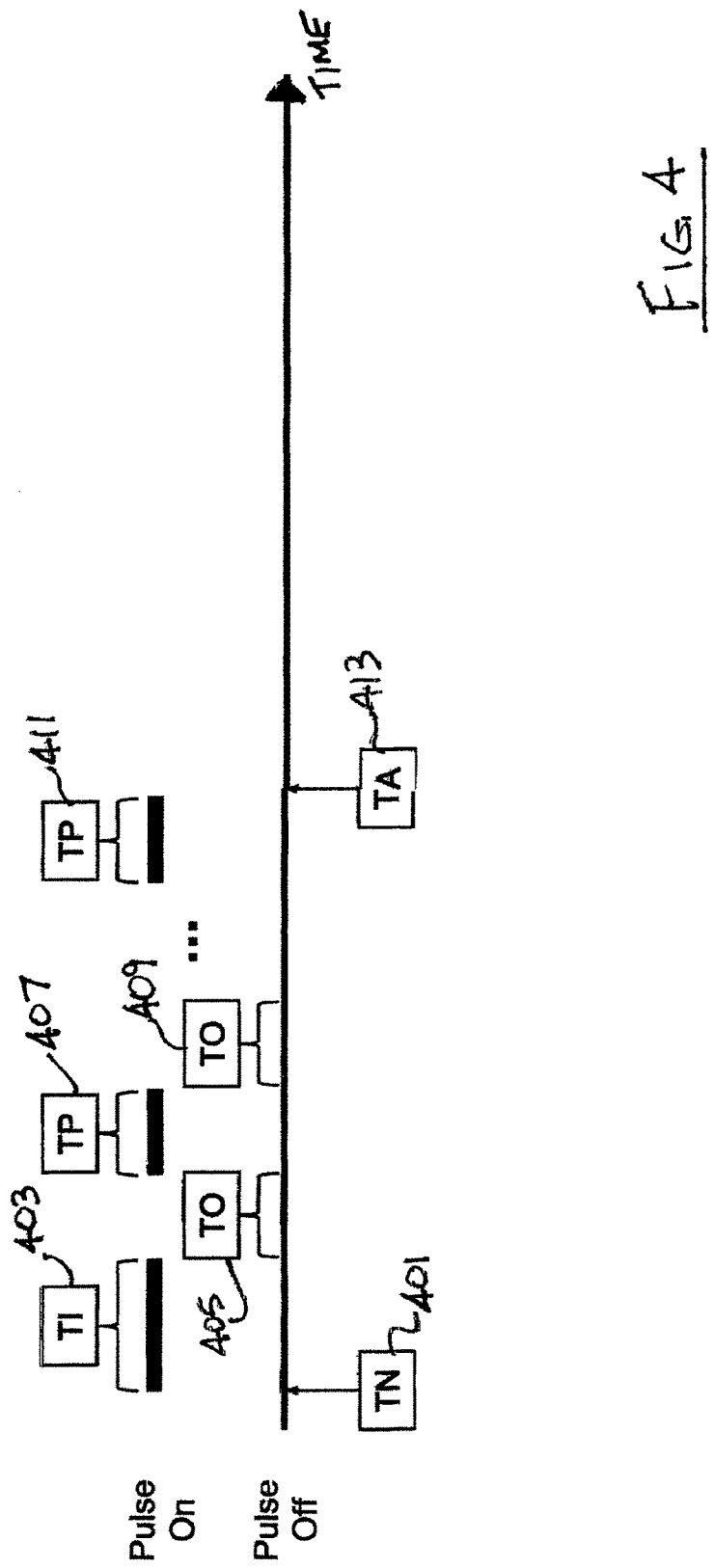
FIG. 4 is a second timing diagram illustrating a procedure for displaying a first notification in the absence of a user interaction, in accordance with a set of exemplary embodiments.
Figure 5:
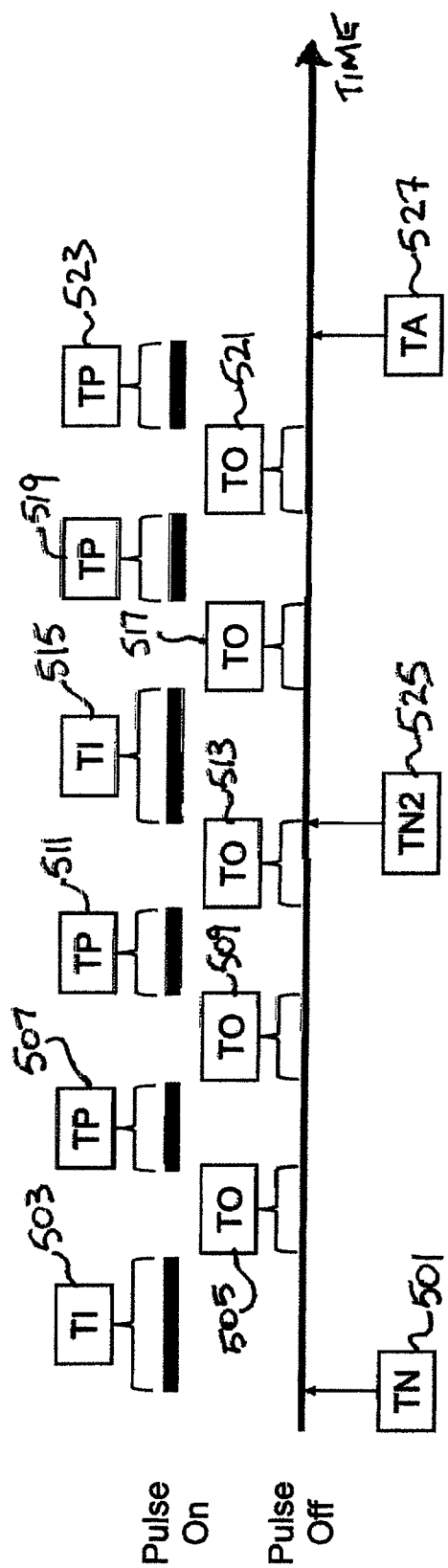
FIG. 5 is a third timing diagram illustrating a procedure for displaying a subsequent notification within a first notification pulsing duration in the absence of a user interaction, in accordance with a set of exemplary embodiments.
Figure 6:
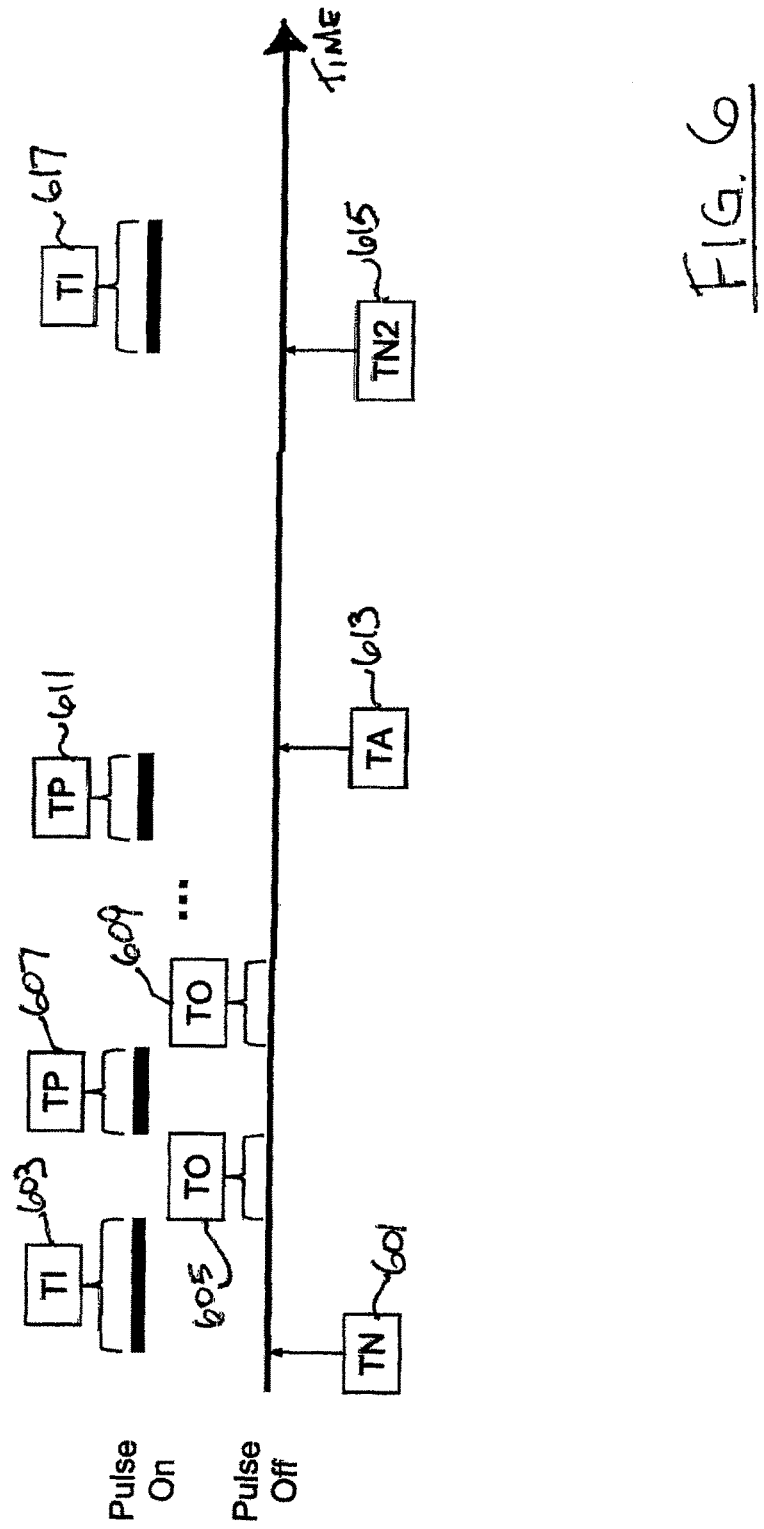
FIG. 6 is a fourth timing diagram illustrating a procedure for displaying a subsequent notification after a first notification pulsing duration in the absence of a user interaction, in accordance with a set of exemplary embodiments.

Referring additionally to FIGS. 4, 5, and 6, additional timing diagram are provided that illustrate additional procedures for displaying notification in accordance with a set of exemplary embodiments. Although one or more of the operations or steps of these procedures can be considered to correspond to (or are substantially similar to) one or more of the operations or steps (or blocks) described in relation to FIGS. 1 and 3, nevertheless these additional procedures differ from those of FIGS. 1 and 3 in various respects as illustrated and discussed below.

More particularly with respect to FIG. 4, there is provided a second timing diagram illustrating a procedure for displaying a first notification in the absence of a user interaction in accordance with a set of exemplary embodiments. At step 401, a first notification arrives at a time TN. Next, at step 403, the first notification is displayed for a first time duration T1. Illustratively, T1 is selected to be within the range of approximately 2 to 60 seconds. For example, a value of 10 seconds may be selected for T1. At step 405, the display of the first notification is turned off for a second time duration T0. Illustratively, T0 is selected to be within the range of approximately 2 to 60 seconds. For example, a value of 5 seconds may be selected for T0. T0 may, but need not, be equal to T1.

At step 407, the first notification is displayed for a third time duration TP and, at step 409, the display of the first notification is turned off for the second time duration T0. Steps 407 and 409 may be repeated one or more times. At step 411, the first notification is displayed a final time for the third time duration TP and, at step 413, a pulsing duration TA for displaying the first notification expires. For illustrative purposes, the pulsing duration TA may be set to 3 minutes from the time TN of the first notification arrival at step 401.

FIG. 5 is a third timing diagram illustrating a procedure for displaying a second notification within a first notification pulsing duration in the absence of a user interaction in accordance with a set of exemplary embodiments. At step 501, a first notification arrives at a time TN. Next, at step 503, the first notification is displayed for a first time duration T1. Illustratively, T1 is selected to be within the range of approximately 2 to 60 seconds. For example, a value of 10 seconds may be selected for T1. At step 505, the display of the first notification is turned off for a second time duration T0. Illustratively, T0 is selected to be within the range of approximately 2 to 60 seconds. For example, a value of 5 seconds may be selected for T0. T0 may, but need not, be equal to T1.

At step 507, the first notification is displayed for a third time duration TP and, at step 509, the display of the first notification is turned off for the second time duration T0. Illustratively, TP is selected to be within the range of approximately 2 to to 60 seconds. For example, a value of 4 seconds may be selected for TP. At step 511, the first notification is displayed for the third time duration TP and, at step 513, the display of the first notification is turned off for the second time duration T0. During the second time duration T0 at step 513, or during the third time duration TP at step 511, a second notification arrives at a time TN2.

Next, at step 515, at least a portion of the first notification, or at least a portion of the second notification, or at least a portion of the first and second notifications, are displayed for the first time duration T1. At step 517, the displayed portions of the first and/or second notifications are turned off for the second time duration T0. At step 519, the portions of the first and/or second notifications are displayed for the third time duration TP and, at step 521, the display of the portions of the first and/or second notifications are turned off for the second time duration T0. At step 523, the portions of the first and/or second notifications are displayed for the third time duration TP. At step 527, a pulsing duration TA for displaying the first and second notifications expires.

FIG. 6 is a fourth timing diagram illustrating a procedure for displaying a second notification after a first notification pulsing duration in the absence of a user interaction, in accordance with a set of exemplary embodiments. At step 601, a first notification arrives at a time TN. Next, at step 603, the first notification is displayed for a first time duration T1. Illustratively, T1 is selected to be within the range of approximately 2 to 60 seconds. For example, a value of 10 seconds may be selected for T1. At step 605, the display of the first notification is turned off for a second time duration T0. Illustratively, T0 is selected to be within the range of approximately 2 to 60 seconds. For example, a value of 5 seconds may be selected for T0. T0 may, but need not, be equal to T1.

At step 607, the first notification is displayed for a third time duration TP and, at step 609, the display of the first notification is turned off for the second time duration T0. Illustratively, TP is selected to be within the range of approximately 2 to 60 seconds. For example, a value of 4 seconds may be selected for TP. Steps 607 and 609 may be repeated one or more times. At step 611, the first notification is displayed for the third time duration TP and, at step 613, a pulsing duration TA for displaying the first notification expires. Next, at step 615, a second notification arrives at a time TN2. At least a portion of the first notification, or at least a portion of the second notification, or at least a portion of the first and second notifications, are displayed for the first time duration at step 617. Accordingly, after the pulsing duration TA expires at step 613, the pulsing of the displayed first notification stops. When the second notification arrives at step 615 and after TA expires at step 613, but prior to detecting any user interaction, the portions of the first and/or second notifications are displayed once only (that is, displayed one time rather than being displayed repeatedly multiple times) at step 617.

It should be appreciated that one or more embodiment encompassed by the present disclosure are advantageous in one or more respects. Thus, it is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A method comprising:
   receiving, at a processor of a mobile device, a first notification;
   in response to the first notification, displaying, on a display device coupled to the processor, a first set of information related to the first notification, the first set of information displayed at a first frequency for a first time period associated with the first notification, wherein the first time period associated with the first notification commences when the first notification is received;
   the processor of the mobile device determining based at least upon data from one or more sensors of the mobile device that a user interaction indicative of a presence of a mobile device user has not occurred or is not occurring yet within the first time period;
   in response to receiving a subsequent notification, displaying, on the display device, an updated set of information related to the subsequent notification, the second set of information displayed at a second frequency during a second time period associated with the subsequent notification that commences upon receipt of the subsequent notification;
   further the processor of the mobile device determining, subsequent to the receiving of the subsequent notification, a first to occur of: (i) the first time period associated with the first notification ending, and (ii) based at least upon data from the one or more sensors of the mobile device that the user interaction indicative of the presence of the mobile device user has occurred; and
   in response to determining the first to occur, the processor of the mobile device ending the displaying of the updated set of information related to the subsequent notification on the display device upon the first to occur of: (i) the first time period associated with the first notification ending, and (ii) the user interaction indicative of the presence of the mobile device user has occurred.

2. The method of claim 1 wherein the first time period associated with the first notification is substantially equal to the second time period associated with the second notification.

3. The method of claim 1 further comprising, in response to the mobile device receiving the subsequent notification prior to an expiration of the first time period associated with the first notification, additionally displaying the updated set of information during any time remaining in the first time period associated with the first notification at the first frequency.

4. The method of claim 1 further comprising additionally displaying the updated set of information related to the subsequent notification or an additional updated set of information related to an additional subsequent notification only once.

5. The method of claim 1, further comprising additionally determining that the user interaction indicative of the presence of a mobile device user has occurred or is occurring and, in response, causing timing associated with one or more periodic timers to be cancelled.

6. The method of claim 1, further comprising repeatedly or continuously determining whether the user interaction has occurred and whether the subsequent notification has occurred prior to the receiving of the subsequent notification.

7. The method of claim 1, wherein displaying, on the display device coupled to the processor, the first set of information related to the first notification, further comprises displaying the first set of information for a first time amount, then turning off the display of the first set of information for an additional time amount, then displaying the first set of information for a further time amount, then again turning off the display of the first set of information for the additional time amount, and then displaying the first set of information for the further time amount, all within the first time period associated with the first notification.

8. A mobile device comprising:
   one or more sensors for detecting a user interaction indicative of a presence of a mobile device user;
   at least one input device for receiving at least a first notification and a subsequent notification;
   a display configured for displaying a first set of information related to the first notification and an updated set of information related to the subsequent notification; and
   a processor, operatively coupled to the at least one input device, the one or more sensors, and the display, for controlling a display of the first and updated sets of information;
   wherein when the processor receives the first notification, the processor causes the display to display the first set of information at a first frequency for a first time period associated with the first notification, wherein the first time period associated with the first notification commences when the first notification is received;
   wherein when the processor determines, based at least on one or more signals from the one or more sensors, that the user interaction has not occurred or is not occurring yet within the first time period associated with the first notification, and the processor receives the subsequent notification, via the input devices, the processor causes the display to display the updated set of information, the updated set of information displayed on the display at a second frequency during a second time period associated with the second notification that commences upon receipt of the subsequent notification;
   further the processor of the mobile device determining, subsequent to the receiving of the subsequent notification, a first to occur of: (i) the first time period associated with the first notification ending, and (ii) based at least upon data from the one or more sensors of the mobile device that the user interaction indicative of the presence of the mobile device user has occurred; and
   in response to determining the first to occur, the processor of the mobile device ending the displaying of the updated set of information related to the subsequent notification on the display device upon the first to occur of: (i) the first time period associated with the first notification ending, and (ii) the user interaction indicative of the presence of the mobile device user has occurred.

9. The mobile device of claim 8 wherein the first time period associated with the first notification is substantially equal to the second time period associated with the second notification.

10. The mobile device of claim 8, wherein when the subsequent notification is received prior to an expiration of the first time period associated with the first notification, the processor additionally displays the updated set of information on the display during any time remaining in the first time period associated with the first notification at the first frequency,
wherein the displaying of the updated set of information at the second frequency occurs after the first time period associated with the first notification has expired.

11. The mobile device of claim 8 wherein in at least one operational circumstance, when it has not been determined that the user interaction has occurred, the processor further displays the updated set of information or an additional updated set of information only one time.

12. The mobile device of claim 8, wherein the mobile device operates in a low power mode of operation when detecting the user action by way of the one or more sensors.

13. The mobile device of claim 8, wherein the user interaction can relate to one or more of a pressing of a power-on key, a nudging of the mobile device, a receipt of an entry of an input into a keypad or the display mechanism of the mobile device, a stowing or removal of the mobile device in a pocket or purse, a reorienting or rotation of the mobile device, a detection of a user motion or a user-applied pressure by way of an infrared sensor or a touch-sensitive display screen, a sensing of a change in room temperature or barometric pressure, a sensing of a source of acoustic energy or a change in ambient noise, a receipt of a voice command, or a detection that another device is present.

14. The mobile device of claim 8, wherein in displaying, on the display device coupled to the processor, the first set of information related to the first notification, the processor further displays the first set of information for a first time amount, then turns off the display of the first set of information for an additional time amount, then displays the first set of information for a further time amount, then again turns off the display of the first set of information for the additional time amount, and then displays the first set of information for the further time amount, all within the first time period associated with the first notification.

15. A non-transitory computer readable memory encoded with a computer program comprising computer readable instructions recorded thereon for execution of a method that includes:
receiving at a processor of a mobile device, a first notification;
displaying, via a display coupled to the processor, a first set of information related to the first notification, the first set of information displayed at a first frequency for a first time period associated with the first notification, wherein the first time period associated with the first notification commences when the first notification is received;
analyzing data from one or more sensors of the mobile device to determine that a user interaction indicative of a presence of a mobile device user has not yet occurred or is not yet occurring within the first time period associated with the first notification; and
in response to receiving a subsequent notification, displaying, on the display, an updated set of information related to the subsequent notification, the second set of information displayed at a second frequency during a second time period associated with the second notification that commences upon receipt of the subsequent notification;
further the processor of the mobile device determining, subsequent to the receiving of the subsequent notification, a first to occur of: (i) the first time period associated with the first notification ending, and (ii) based at least upon data from the one or more sensors of the mobile device that the user interaction indicative of the presence of the mobile device user has occurred; and
in response to determining the first to occur, the processor of the mobile device ending the displaying of the updated set of information related to the subsequent notification on the display device upon the first to occur of: (i) the first time period associated with the first notification ending, and (ii) the user interaction indicative of the presence of the mobile device user has occurred.

16. The non-transitory computer readable memory of claim 15 wherein the first time period associated with the first notification is substantially equal to the second time period associated with the second notification.

17. The non-transitory computer readable memory of claim 15 wherein the first frequency is substantially equal to the second frequency.

18. The non-transitory computer readable memory of claim 15 further comprising instructions wherein, in response to the mobile device receiving the subsequent notification prior to an expiration of the first time period associated with the first notification, the updated set of information is additionally displayed during any time remaining in the first time period associated with the first notification at the first frequency, and
wherein the displaying of the updated set of information at the second frequency occurs after the first time period associated with the first notification has expired.

19. The non-transitory computer readable memory of claim 15 further comprising instructions wherein, in response to not detecting the presence of the user throughout the first time period associated with the first notification, the updated set of information related to the subsequent notification or an additional updated set of information related to an additional subsequent notification is additionally displayed one time rather than repeatedly.

20. The non-transitory computer readable memory of claim 15 further comprising instructions according to which the first set of information is displayed for a first time amount, then turned off for an additional time amount, then turned back on for a further time amount, then turned back off again for the additional time amount, and then turned back on again for the further time amount all within the first time period associated with the first notification.

* * * * *